United States Patent
Schuler et al.

(10) Patent No.: US 6,314,974 B1
(45) Date of Patent: Nov. 13, 2001

(54) POTTED TRANSDUCER ARRAY WITH MATCHING NETWORK IN A MULTIPLE PASS CONFIGURATION

(75) Inventors: Malcolm R. Schuler, Mountaintop; Robert F. Longenberger, Shickshinny; Rodney S. Ridley; Thomas E. Grebs, both of Mountaintop; Jason R. Trost, Drums; Raymond J. Webb; Michael A. Caravaggio, both of Mountaintop; Terry L. Fenstermacher, Nescopeck, all of PA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/344,867

(22) Filed: Jun. 28, 1999

(51) Int. Cl.$^7$ ........................................... B08B 3/12
(52) U.S. Cl. ........................................... 134/184; 134/902
(58) Field of Search ........................ 134/184, 186, 134/902, 1.3

(56) References Cited

U.S. PATENT DOCUMENTS

| | | |
|---|---|---|
| 4,118,649 | 10/1978 | Shwartzman et al. . |
| 4,326,553 | 4/1982 | Hall . |
| 4,543,130 | 9/1985 | Shwartzman . |
| 4,736,759 | 4/1988 | Coberly et al. . |
| 4,736,760 | 4/1988 | Coberly et al. . |
| 4,804,007 | 2/1989 | Bran . |
| 4,854,337 | 8/1989 | Bunkenburg et al. . |
| 4,869,278 | 9/1989 | Bran . |
| 4,979,994 | 12/1990 | Dussault et al. . |
| 4,998,549 | 3/1991 | Bran . |
| 5,037,481 | 8/1991 | Bran et al. . |
| 5,090,432 | 2/1992 | Bran . |
| 5,143,103 | 9/1992 | Basso et al. . |
| 5,148,823 | 9/1992 | Bran . |
| 5,247,954 | 9/1993 | Grant et al. . |
| 5,286,657 | 2/1994 | Bran . |
| 5,339,842 | 8/1994 | Bok . |
| 5,355,048 | 10/1994 | Estes . |
| 5,365,960 | 11/1994 | Bran . |
| 5,383,484 | 1/1995 | Thomas et al. . |
| 5,427,622 | 6/1995 | Stansolvich et al. . |
| 5,456,759 | 10/1995 | Stanford et al. . |
| 5,520,205 | 5/1996 | Guldi et al. . |
| 5,533,540 | 7/1996 | Stanasolovich et al. . |
| 5,534,076 | 7/1996 | Bran . |
| 5,579,792 | 12/1996 | Stanasolovich et al. . |

OTHER PUBLICATIONS

Robert F. Longenberger, "Improvements to the Megasonic Cleaning of Silicon Wafers", *Harris Semiconductor*, pp. 1–15 Jul. 1995.

R.S. Ridley, et al, "Advanced Aqueous Wafer Cleaning In Power Semiconductor Device Manufacturing", IEEE/SEMI Advanced Semiconductor Manufacturing Conference, pp.: 235–242 Aug. 1998.

*Primary Examiner*—Philip R. Coe
(74) *Attorney, Agent, or Firm*—Jaeckle Fleischmann & Mugel, LLP

(57) ABSTRACT

The invention provides a pair of parallel megasonic transducers that generate parallel columns of megasonic waves across a cleaning container. Semiconductor wafers move back and forth transverse to the columns. The transducers have their back side potted with a silicone elastomer to prevent corrosion. In another embodiment megasonic waves from in-line transducers are dispersed with a cylindrical quartz rod. Water is enriched with ozone by pumping ozone under pressure through a filter into sealed housing of deionized water.

15 Claims, 4 Drawing Sheets

POTTED TRANSDUCER ARRAY WITH MATCHING NETWORK IN A MULTIPLE PASS CONFIGURATION

BACKGROUND OF THE INVENTION

This invention relates in general to transducer assemblies and, in particular, to improvements in methods and apparatus for megasonic semiconductor wafer cleaning.

Megasonic energy and waves are used to clean and remove particles from the surface of semiconductor wafers during wafer processing into devices and integrated circuits. High frequency acoustic energy is termed megasonic for frequencies in the range of 0.5 MHZ and 2 MHZ or higher. Acoustic energy is termed ultrasonic when frequencies range from 20 KHZ to 0.5 MHZ.

Megasonic cleaning is used at many stages in the fabrication process for removing particles, photoresist, dewaxing and degreasing using different solvents and stripping solutions. It has also been shown that megasonic energy will aid in the removal of particulates ($\geq 0.1$ micron) that are tightly adhered to the wafer surface. The primary advantages of using megasonic cleaning is that it saves in the cost of chemical cleaners, provides superior cleanliness and simultaneously cleans both sides of the wafers, thereby requiring less handling.

Existing megasonic cleaning systems have several drawbacks. In a typical megasonic transducer, a monoclinic quartz piezoelectric crystal is mounted on a quartz plate. The megasonic energy from the crystal is transmitted through the quartz plate into the cleaning solution. The quartz plate may be exposed to the cleaning solution or may transmit the megasonic energy through the tank floor. A typical tank is made of natural polypropylene that does not readily transmits megasonic waves. The thickness of the quartz plate is critical for maximum transmission of the megasonic energy into the cleaning solution.

The back side of the quartz piezoelectric crystal has a bus bar for receiving electrical energy from a cable. The bus bar and the cable connection are typically left open and uninsulated. It has been observed that over time, corrosive fumes escaping from the cleaning solution in the open tank corrode the bus bar and cable connection. While others have completely encapsulated the quartz piezoelectric element, the encapsulation of the surface of the piezoelectric element that faces the quartz plate requires substantial modifications in the size of the plate so that acoustic energy is properly transmitted to the cleaning solution. See, for example, U.S. Pat. No. 5,355,048.

In a typical megasonic cleaning apparatus, one or more transducers are placed at the bottom of the cleaning tank and are substantially in line with one another. These transducers generate columns of standing wave megasonic energy that extend from the bottom of the tank to the top. Studies have revealed that these standing waves often have dead zones or stagnant zones where the megasonic energy has reduced power. If the wafers or portions of the wafers are disposed in those stagnant zones, those wafers or portions of the wafers will not be cleaned as well as the rest of the wafers. In order to remedy this problem, others have proposed moving the wafers from side to side or rotating the wafers. See, for example, U.S. Pat. Nos. 5,427,662 and 5,520,205. Still others have fashioned hollow cylindrical quartz plates with corresponding cylindrical piezoelectric crystals or have provided solid half cylindrical quartz plates fixed to the bottom of the tank for dispersing the sonic energy. See, for example, U.S. Pat. Nos. 4,869,278 and 4,998,549.

Once the wafers have been cleaned, it is important to provide a thin native oxide layer on the wafers as soon as possible in order to prevent contamination of the wafer during its fabrication. Native oxide readily forms on bare silicon wafer surfaces with or without ozone. However when it is formed slowly or in a uncontrolled manner it will tend to incorporate high levels of SiOx particles or other contaminants. Using high levels of ozone (>7 ppm) helps to form a quick and clean native oxide. Such a native oxide layer can be provided by subjecting the wafers to a bath of ozone-rich water. However, current techniques for ozonating water are inadequate. The ozone quickly leaves the water-bath and so the wafers do not receive the desired native oxide layer.

SUMMARY

The invention provides solutions for the above described shortcomings of the prior art. One of the features of the invention is a silicon elastomer to pot or encapsulate the back surface only of the connection between the bus bar and the cable. This invention avoids the difficulties of providing insulation between the piezoelectric crystal and the quartz plate. By potting only the back surface of the bus bar and cable connection, the transmission structure of the quartz wave plate and the quartz crystal remain unaltered. The potting prevents the fumes from corroding or otherwise damaging the electrical connection between the cable and the bus bar itself and the quartz transducer.

The invention provides two solutions for dispersing sonic energy over the wafers. The first solution provides a double pass structure and method. In this solution, the transducers comprise two or more transducers arranged parallel to each other along the bottom of the tank and orthogonal to the vertical position of the wafers or product to be cleaned. The wafers are inserted into the tank and then are moved reciprocally at least twice along a path that is substantially perpendicular to the columns of megasonic energy created by the parallel transducers. This method ensures that each wafer passes through the maximum megasonic energy at some point during their transfer through the megasonic energy.

The second solution for dispersing the megasonic energy provides in a structure that uses typical in-line transducers and a cylindrical quartz rod. The cylindrical quartz rod is disposed in the cleaning apparatus and above and separated from the transducers. The cylindrical rod intercepts megasonic waves emanating from the quartz plate at the bottom of the tank and disperses and re-directs the waves away from their intended vertical path.

Finally, the invention provides an ozone-capturing apparatus and method. This apparatus and method uses a reverse polytetrafluroethylene (Teflon) filter. The filter is immersed in a housing of water. Ozone is pumped into the filter under pressure with a check valve to prevent the back flow of ozone. The receiving housing is filled with water and is likewise sealed. The ozone under pressure is forced out of the Teflon filter and into the surrounding water. The ozonated water is withdrawn from the base of the housing and is passed to a wafer ozone bath for applying the ozonated water to the wafer. With the ozonated water applied to the wafer, the wafers quickly acquire a thin layer of virtually contaminant free native oxide. That layer of native oxide aides in protecting the wafers from further contaminants during the further wafer processing. Note that native oxide is self-limiting in its growth, with the final thickness (usually <50 Å) dependant on the ambient, temperature and pressure under which it is formed.

DETAILED DESCRIPTION OF THE DRAWINGS

Figure 1:
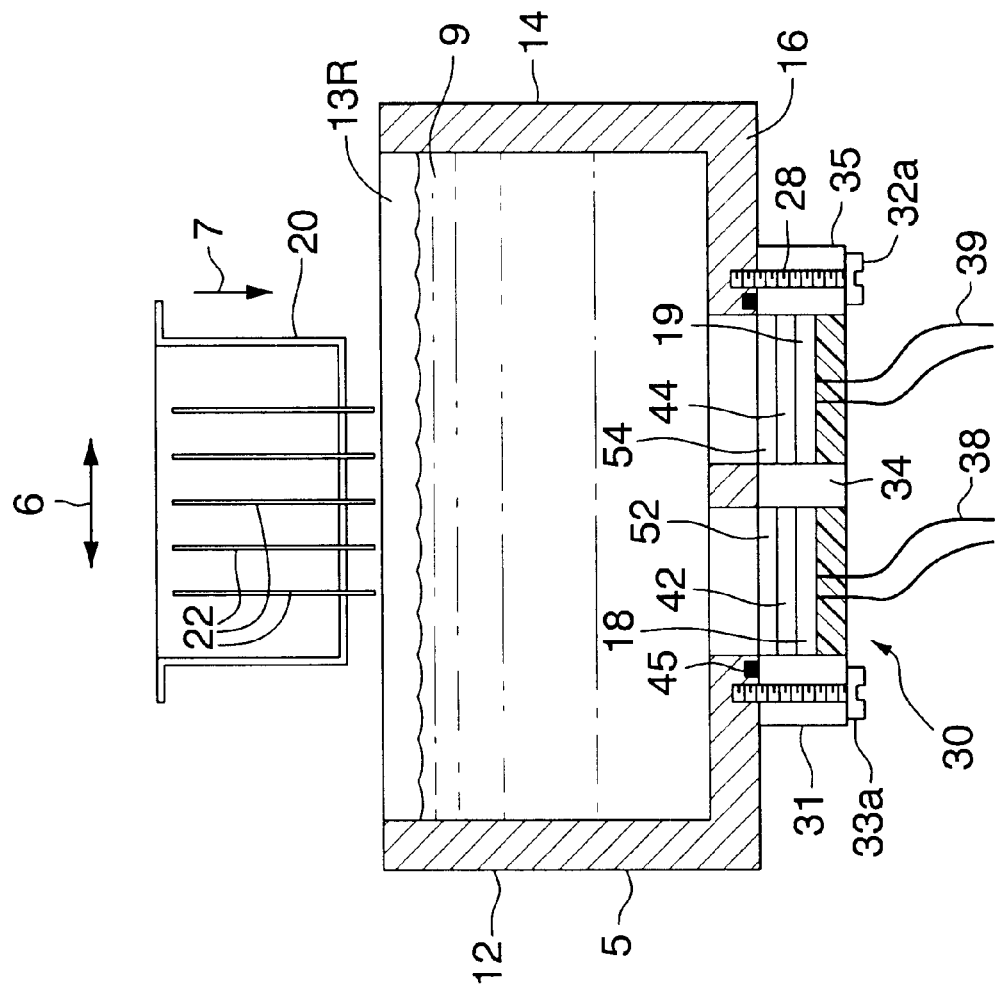
FIG. 1 is a sectional view showing a potted transducer and megasonic apparatus with parallel transducers.
Figure 1:
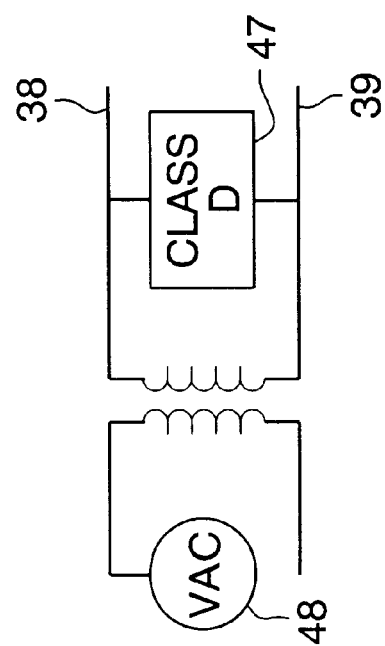
Figure 2:
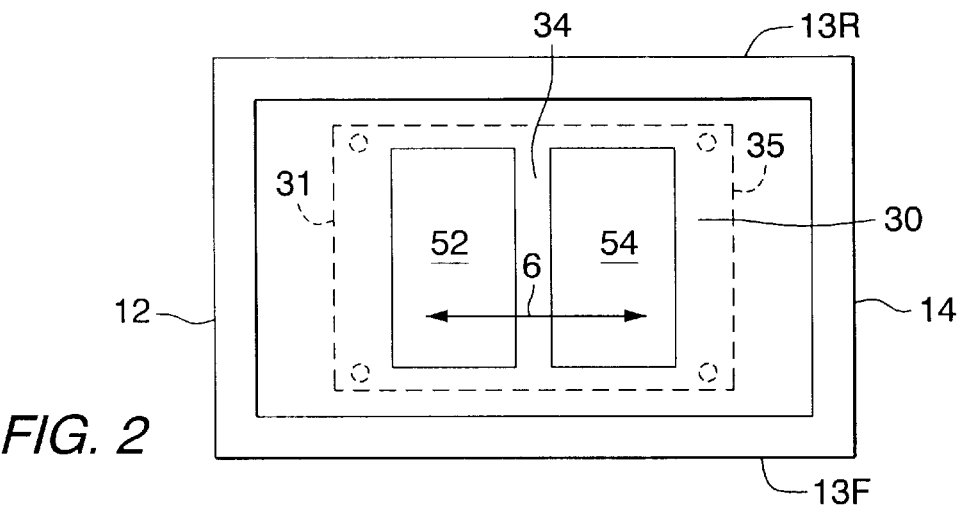
FIG. 2 is a top view of the megasonic apparatus of FIG. 1.

With reference to FIGS. 1 and 2, there is shown a megasonic apparatus 10 that includes a container 5 with endwalls 12, 14 and sidewalls 13F, 13R. The container is filled with a cleaning fluid 9. A plurality of semiconductor wafers 22 are held in a wafer boat 20 that is supported above the tank by a conventional carriage or robotic arm (not shown). The transducer 30 is mounted to the floor 16 of the container. As shown in FIG. 2, a pair of quartz plates 52, 54 face the floor of the container 16. Quartz plates are mounted to piezoelectric transducers 42, 44. Those transducers convert electrical energy into megasonic sound waves. Electrical energy is supplied to the transducers by bus bars 18, 19, respectively. The bus bars are coupled via cables 38, 39 to oscillators that generate electrical signals for actuating the piezoelectric crystals 42, 44. Screws 33a, 33b and 32a, 32b couple the transducer frame 30 to the floor 16. Alternatively, cables 38, 39 are coupled to a class D amplifier 47 and a matching transformer 48 for generating electrical signals that are matched to electro-sonic characteristics of the transducers for generating megasonic sound waves in the cleaning fluid 9.

Figure 3:
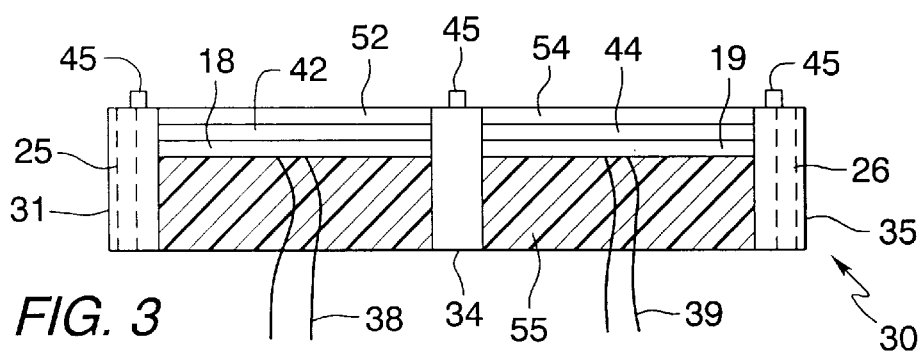
FIG. 3 is an expanded sectional view of the transducer of FIG. 1.
Figure 4:
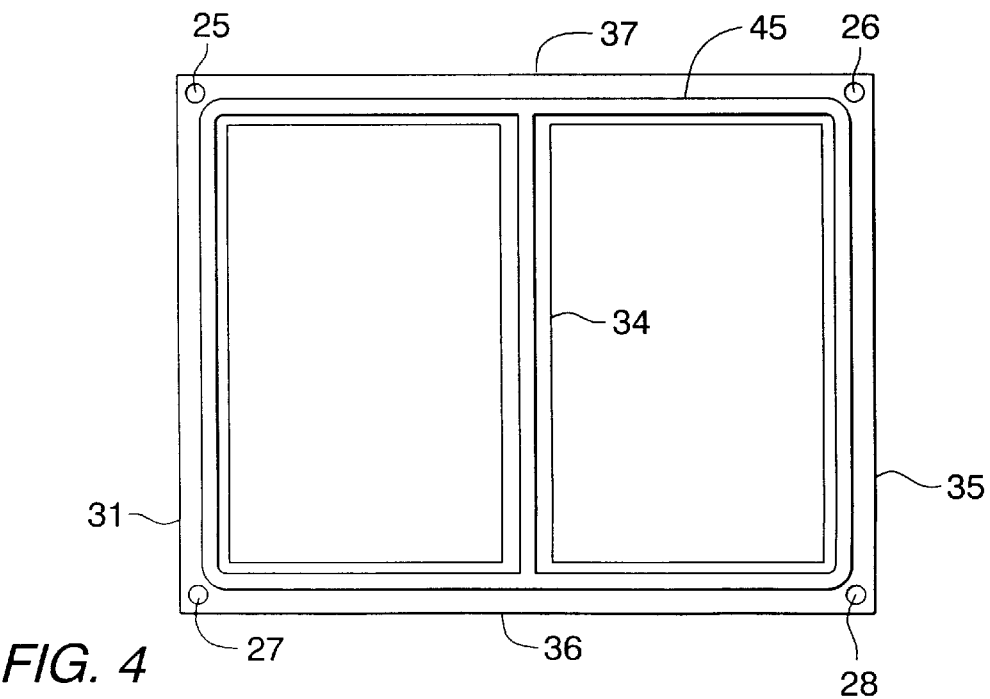
FIG. 4 is an expanded top view of the transducer shown in FIG. 3.

With reference further to FIGS. 3 and 4, there is shown a gasket 45 that is disposed around the periphery of the top surface of the transducer 30. The transducer 30 includes sidewalls 31, 35, endwalls 36, 37 and a center wall 34. The gasket 45 is preferably made of any suitable, flexible insulating material. The preferred gasket is made of Gortex®. The quartz plate, crystal and bus bar assembly is mounted on the top side of the frame. The remaining cavity behind the bus bars 18, 19 is filled with a suitable insulation material 55. The insulation material 55 may be any suitable potting material, for example, a silicone elastomer. The silicone elastomer material seals the bus bar and the cable connection from corrosive fumes that escape the open top of the container 5.

In operation, the megasonic transducers 30 generate parallel columns of standing megasonic waves. The wafers 22 are lowered in their wafer boat 20 into the cleaning fluid 9. The carriage or robotic arm translates the wafers in the direction shown by arrow 6. This direction is transverse to the column of standing megasonic waves. By passing through the standing columns of megasonic waves in a first direction and then in the opposite direction, the wafers are all exposed to substantial megasonic energy and no one wafer is permanently resident in a stagnant zone.

Figure 5:
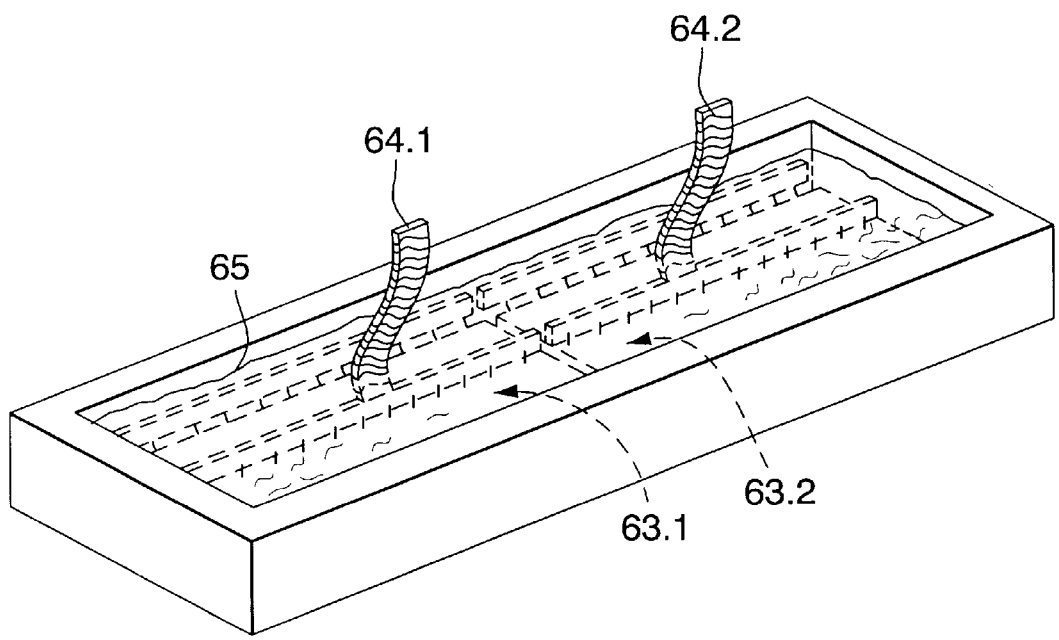
FIG. 5 is a partial perspective view of in-line potted transducers.
Figure 6:
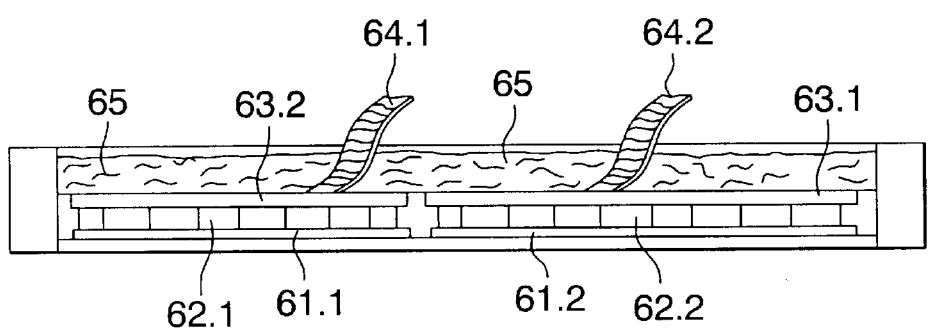
FIG. 6 is a sectional view of the transducer shown in FIG. 5.

An alternate potted embodiment of the invention is shown in FIGS. 5 and 6. There, in-line transducers 60.1, 60.2 include piezoelectric elements 61.2, 61.2. On top of the piezoelectric elements are, respectively, quartz plates 62.1 and 62.2. Bus bars 63.1 and 63.2 carry electrical energy from cables 64.1 and 64.2 to the piezoelectric elements 61.1, 61.2. Potting materials such as silicone elastomer 65 fills the back side of the cavity of the transducer frame.

In both of the above embodiments, the quartz plates are sized to a thickness that corresponds to an odd quarter wavelength of the megasonic wave. By an odd quater wavelength is meant a number of quarter wavelengths where the number is one of a sequence of natural numbers beginning with one and counting by twos and are not divisible by two. In these embodiments, it is preferred that the odd quarter wavelength be a number of 0.177 inches and is preferably in a range of 0.150 inches to 0.200 inches or a multiple thereof. The quartz plate is chosen to be an odd quarter wavelength in order to provide a desired acoustic matching between the piezoelectric crystal, the megasonic waves, and the cleaning fluid 9. By choosing an odd quarter wavelength maximum energy transfer is obtained with little or no absorption of the energy by the quartz plate.

Figure 7:
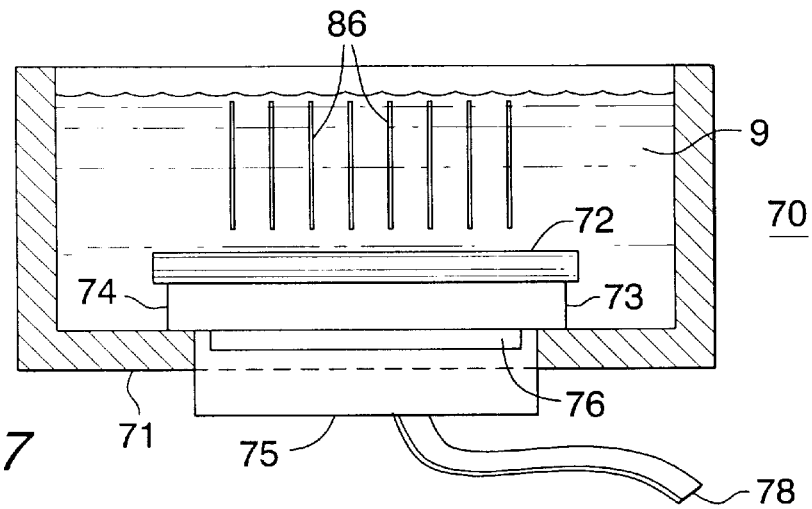
FIG. 7 is a sectional view of a megasonic apparatus with a cylindrical dispersion rod.
Figures 8, 9:
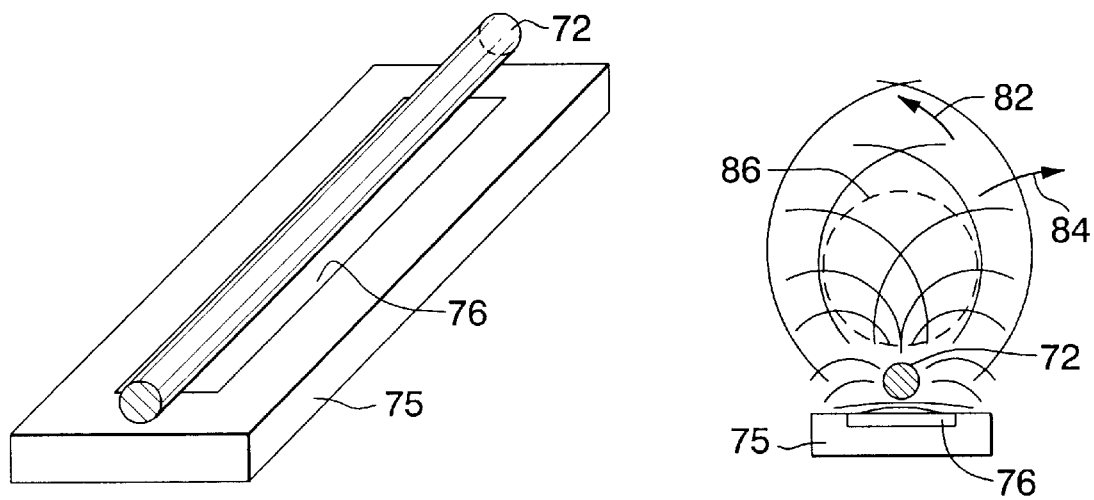
FIG. 8 is a partial perspective view of the dispersion rod and the transducer of FIG. 7.
FIG. 9 is an end view showing the wafer and the dispersed megasonic waves produced by the transducer in the cylindrical rod.

Turning now to FIGS. 7–9, there is shown an alternate embodiment for dispersing the megasonic energy throughout the container. In this embodiment, a cylindrical rod 72 is spaced from the floor of the tank 71 and is supported by supports 74, 73 located at opposite ends of the rod. A transducer 75 with a quartz plate 76 is locates beneath the rod 72. Although only one transducer is shown in the figures, those skilled in the art will appreciate that two or more transducers may be arranged in line with each other as shown in FIGS. 5 and 6. In operation, megasonic energy emitted from the quartz plate 76 is intercepted by the rod 72. As shown in FIG. 9, the rod 72 is located in the cleaning fluid and between the floor of the tank and the wafers 86. When the rod 72 intercepts the megasonic waves, it disperses them throughout the cleaning fluid 9. This dispersion avoids the problems inherent in standing waves. Thus, the megasonic energy is dispersed throughout the cleaning fluid 9 and all of the wafers 86 are substantially, evenly cleaned but at a lower power density than can be realized by the first solution of a very focused laminar power dispersion.

Figure 10:
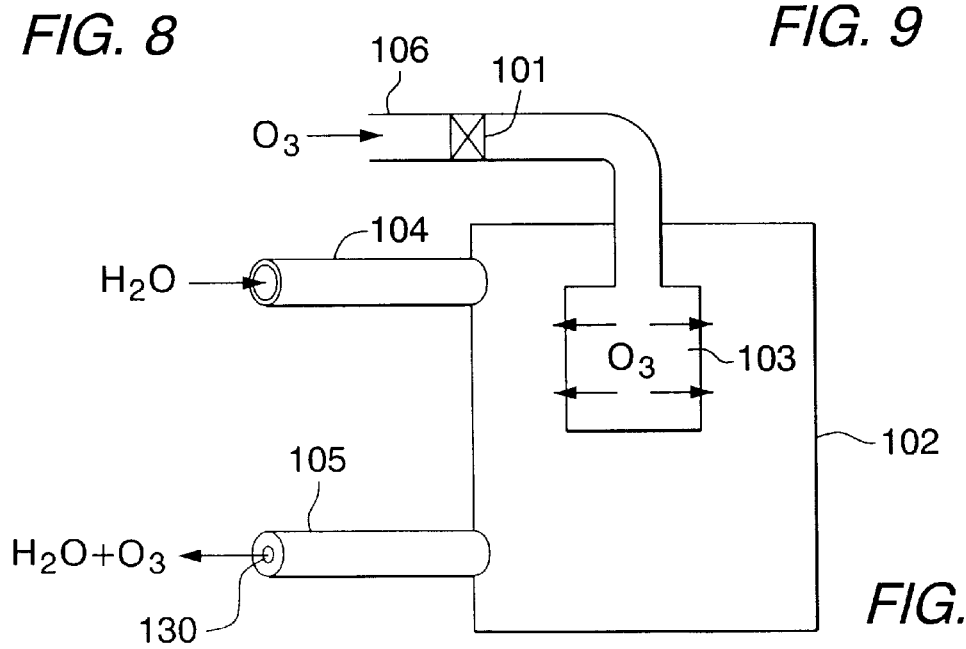
FIG. 10 is a schematic diagram of the ozonated water apparatus.

Turning to FIG. 10, there is shown an improved apparatus for dissolving ozone into water. In prior art techniques, surface passivation is provided by hydrogen peroxide. However, it has been found that hydrogen peroxide may contain metallic contaminants which are undesirable. It is desired that the ratio of ozone to water should be more than 7 parts per million in order to achieve a rapid silicon surface conversion to a native oxide. Improper ozone levels result in silicate particulates.

In the inventive apparatus, a polytetrafluroethylene (Teflon) filter 103 is immersed in a sealed water housing 102. Ozone is introduced through an inlet line 106 that has an in-line check valve 101. The Teflon filter allows the ozone 103 to dissolve into the water in the housing 102. The ozonated water is then discharged through discharge outlet 105. That water is then placed into a container where the wafers are rapidly oxidized leaving a thin oxide layer with virtually no metallic or organic contamination. The inlet 104 carries highly deionized water. The ozone is introduced into the water through a high purity Teflon filter housing that contains a 0.1 micron Teflon filter cartridge. The filter openings must be large enough to permit ozone to flow from through the openings and into the housing 102. Since the ozone and the water are mixed in a sealed environment 102, there is little or no free ozone in the discharge fluid. The ozonating operation is normally carried out at a temperature of about 20 degrees C., ±2 degrees C. Lower temperatures will result in more ozone dissolving in the water. In the preferred embodiment, the discharge fluid from orifice 130 is at least 7 parts per million of ozone.

The above examples are not intended to limit the spirit and scope of the invention. Those skilled in the art understand that further additions, modifications and changes may be made to the invention without department from the appended claims.

What is claimed is:

1. A megasonic cleaning apparatus comprising:
    a container for holding a cleaning fluid and a plurality of semiconductor wafer, said container having a rectangular configuration with a floor, four wall, and an open top;
    a megasonic transducer array mounted to the floor of the container, said array comprising a frame for holding one or more transducers, each transducer comprising a piezoelectric element bonded to a transmitting plate for coupling megasonic energy from the piezoelectric elements into the cleaning fluid;
    one or more electrical cables connected to the piezoelectric elements and extending from the element to a source of electrical energy wherein said transmitting plates, said piezoelectric elements and said connections to the cables all encapsulated in a material that resists intrusion from liquid in the container.

2. The megasonic cleaning apparatus of claim 1 wherein the encapsulating material comprises silicone.

3. The megasonic cleaning apparatus of claim 1 wherein the megasonic transducers comprise a piezoelectric element bonded to a odd quarter wave length quartz plate, said odd quarter wave length quartz plate having first and second planar surfaces separated from each other by the thickness of the quartz plate, said first planar surface facing the floor of the tank for coupling sonic energy from the transducers into the cleaning fluid in the tank and the second planar surfaces bonded to the piezoelectric element.

4. The megasonic cleaning apparatus of claim 1 wherein the transducers are parallel to each other.

5. The megasonic cleaning apparatus of claim 1 wherein the transducers are in line with each other.

6. A megasonic cleaning apparatus comprising:
    a container for holding a cleaning fluid and a plurality of semiconductor wafers, said container having a rectangular configuration with a floor, four walls, and an open top;
    a megasonic transducer array mounted to the floor of the container, said array comprising a frame for holding two or more transducers, said transducers arranged in parallel and aligned transverse to the intended direction of the wafers,
    each transducer comprising a piezoelectric element bonded to an odd quarter wave length quartz plate, said odd quarter wave length quartz plate having first and second planar surfaces separated from each other by the thickness of the quartz plate, said first planar surface facing the floor of the tank for coupling sonic energy from the transducers into the cleaning fluid in the tank and the second planar surfaces bonded to the piezoelectric element; and
    one or more electrical cables connected to the piezoelectric elements and extending from the element to a source of electrical energy.

7. The megasonic cleaning apparatus of claim 6 wherein said quartz plates, piezoelectric elements and said connections to the cables all encapsulated in a material that resists intrusion from liquid in the container.

8. The megasonic cleaning apparatus of claim 7 wherein the encapsulating material comprises silicone.

9. The megasonic cleaning apparatus of claim 6 wherein the transducer array further comprises a rectangular frame for supporting the quarter wave plates and the piezoelectric elements.

10. The megasonic cleaning apparatus of claim 6 further comprising an odd quarter wave plate coupled to the surface of the transducers and having a thickness that is an odd quarter wave length of sound waves transmitted by the transducers.

11. The megasonic cleaning apparatus of claim 6 further comprising a megasonic generator for generating megasonic electrical signals, an odd quarter wave plate coupled to the surface of the transducers and having a thickness that is an odd quarter wave length of selected megasonic waves transmitted by the transducers, and means for adjusting the megasonic generator to generate electrical signals that correspond to the selected sound waves.

12. The megasonic cleaning apparatus of claim 6 further comprising a class D amplifier and a matching transformer for generating electrical signals that are matched to electrosonic characteristics of the transducers for generating megasonic sound waves in the cleaning fluid.

13. A megasonic cleaning apparatus comprising:
    a container for holding a cleaning fluid and a plurality of semiconductor wafers, said container having a rectangular configuration with a floor, four walls, and an open top;
    a megasonic transducer array mounted to the floor of the container, said array comprising a frame for holding one or more transducers, said transducer comprising a piezoelectric element bonded to transmitting plate for coupling megasonic energy from the piezoelectric elements into the cleaning fluid and an electrical cable connected to the piezoelectric elements;
    each transmitting plate comprising a quartz plate having a thickness corresponding to an odd quarter wave length of the megasonic waves generated by the piezoelectric elements.

14. The megasonic cleaning apparatus of claim 13 wherein the transmitting plates, piezoelectric elements and said connections to the cables all are encapsulated in a material that resists intrusion from liquid in the container.

15. The megasonic cleaning apparatus of claim 13 wherein the encapsulating material comprises silicone.

* * * * *